US012806957B2

(12) United States Patent
Henry et al.

(10) Patent No.: US 12,806,957 B2
(45) Date of Patent: Nov. 24, 2026

(54) SUSPENSION SYSTEM

(71) Applicant: McLaren Automotive Limited, Woking (GB)

(72) Inventors: Paul Henry, Woking (GB); Stephen Paine, London (GB); Andrea Fortina, Woking (GB); Gareth Wakelam, Woking (GB); Carlo Belluomo, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 19/340,429

(22) Filed: Sep. 25, 2025

(65) Prior Publication Data

US 2026/0091638 A1 Apr. 2, 2026

(30) Foreign Application Priority Data

Sep. 30, 2024 (GB) ...................................... 2414376

(51) Int. Cl.
*B60G 21/00* (2006.01)
*B60G 3/26* (2006.01)

(52) U.S. Cl.
CPC ............. *B60G 21/005* (2013.01); *B60G 3/26* (2013.01); *B60G 2200/144* (2013.01);
(Continued)

(58) Field of Classification Search
CPC ...... B60G 21/005; B60G 21/073; B60G 3/26; B60G 2200/144; B60G 2202/1362;
(Continued)

(56) References Cited

U.S. PATENT DOCUMENTS

2008/0277891 A1 11/2008 Adams et al.
2016/0016451 A1* 1/2016 Izak .................. B60G 17/0416 280/5.503

(Continued)

FOREIGN PATENT DOCUMENTS

CN 118578831 A 9/2024
WO WO 2001/017807 A1 3/2001
WO WO-0117807 A1 * 3/2001 ......... B60G 21/0553

OTHER PUBLICATIONS

Search Report in United Kingdom Appln. No. GB2414376.0, mailed on Mar. 7, 2025, 4 pages.

(Continued)

*Primary Examiner* — Jason D Shanske
*Assistant Examiner* — Matthew James O'Neill
(74) *Attorney, Agent, or Firm* — Fish & Richardson P.C.

(57) ABSTRACT

A vehicle comprising: a vehicle body; first and second wheel assemblies each having a rotation axis; first and second suspension linkages, each suspension linkage coupling a respective wheel assembly to the vehicle body to permit motion of the rotation axis of that wheel assembly relative to the vehicle body; first and second dampers, each damper coupled to a respective suspension linkage to constrain the motion of the associated wheel assembly by applying a damper force to the suspension linkage; first and second springs, each spring coupled to a respective suspension linkage; and a cross-vehicle linkage coupled between the first and second springs, the cross-vehicle linkage being configured to have: (i) a first mode in which the cross vehicle linkage prohibits the first and second springs from constraining the motion of the associated wheel assembly, and (ii) a second mode in which the cross vehicle linkage permits the first and second springs to constrain the motion of the associated wheel assembly.

20 Claims, 5 Drawing Sheets

(52) U.S. Cl.
CPC ................ *B60G 2202/1362* (2013.01); *B60G 2202/312* (2013.01); *B60G 2204/1242* (2013.01); *B60G 2204/421* (2013.01)

(58) Field of Classification Search
CPC ........ B60G 2202/312; B60G 2202/134; B60G 2202/135; B60G 17/00; B60G 2204/1242; B60G 2204/421
See application file for complete search history.

(56) References Cited

U.S. PATENT DOCUMENTS

| | | | | |
|---|---|---|---|---|
| 2018/0043744 | A1 | 2/2018 | Villegas et al. | |
| 2023/0415534 | A1* | 12/2023 | Schröder ............. | B60G 17/025 |
| 2024/0278615 | A1 | 8/2024 | Nordhaus et al. | |

OTHER PUBLICATIONS

European Search Report in European Appln. 25205386.3, mailed on Feb. 25, 2026, 9 pages.

* cited by examiner

SUSPENSION SYSTEM

CROSS-REFERENCE TO RELATED APPLICATIONS

The present application claims priority to Application No. GB 2414376.0, filed on Sep. 30, 2024, the contents of which are hereby incorporated by reference.

TECHNICAL FIELD

This invention relates to a vehicle having a cross-vehicle linkage.

BACKGROUND

A typical road vehicle comprises a suspension linkage between each wheel of the vehicle and a vehicle body. The suspension linkages support the body of the vehicle by connecting the respective wheel to the body of the vehicle. Each wheel is typically mounted on bearings and the bearings are attached to the body of the vehicle via the suspension linkages. The suspension linkages support the body against those bearings and thus against the wheel.

Each suspension linkage is designed to permit the wheels of the vehicle to move relative to the body of the vehicle. This movement of the wheels enables the vehicle body to be at least partially isolated from displacements of the wheels relative to the vehicle body. The displacement range provided by the suspension linkages of each wheel, relative to the vehicle body, is generally limited. This limitation normally stems from the packaging of the suspension systems in the vehicle. For example, the wheels are normally located in wheel arches of the vehicle body and thus the wheels can only move upwards a certain distance before coming in to contact with the interior of the wheel arches. Therefore, the motions of the wheels are generally constrained to avoid this happening. Vehicles typically comprise at least one damper which is used to constrain the motion of the suspension linkage which in turn constrains the motion of the respective wheel.

It is increasingly common for vehicles to have selectable dynamic modes which change the operating parameters for the vehicle. This is particularly true with high performance vehicles such as sports cars. These dynamic modes can be tailored to different driving situations for the vehicle, such as a comfort mode for driving on the public roads and a race mode for driving on a track and/or when the driver wants to drive enthusiastically. These different situations call for different control strategies when it comes to controlling the constraint of the wheels. This is because in a comfort mode there is generally a desire to have more compliant suspension that prioritises passenger comfort over vehicle performance and in a race mode there is generally a desire to prioritise vehicle performance over passenger comfort.

Therefore, it would be desirable for there to be an improved suspension system for a vehicle which provides different constraint strategies for the wheels in different operating situations.

SUMMARY

According to a first aspect of the present invention there is provided a vehicle comprising: a vehicle body; first and second wheel assemblies each having a rotation axis; first and second suspension linkages, each suspension linkage coupling a respective wheel assembly to the vehicle body to permit motion of the rotation axis of that wheel assembly relative to the vehicle body; first and second dampers, each damper coupled to a respective suspension linkage to constrain the motion of the associated wheel assembly by applying a damper force to the suspension linkage; first and second springs, each spring coupled to a respective suspension linkage; and a cross-vehicle linkage coupled between the first and second springs, the cross-vehicle linkage being configured to have: (i) a first mode in which the cross vehicle linkage prohibits the first and second springs from constraining the motion of the associated wheel assembly, and (ii) a second mode in which the cross vehicle linkage permits the first and second springs to constrain the motion of the associated wheel assembly.

The first and second wheel assemblies may be front wheel assemblies and may be located on opposite sides of a longitudinal centreline of the vehicle. The first spring may be coupled to a first attachment point of the cross vehicle linkage and the second spring may be coupled to a second attachment point of the vehicle linkage, in the first mode the cross-vehicle linkage may have a variable length between the first and second attachment points and in the second mode the cross-vehicle linkage may have a fixed length between the first and second attachment points. The cross-vehicle linkage may comprise: a cylinder comprising a chamber; a piston moveable along the chamber, the piston dividing the chamber into a first volume and a second volume; and a fluid pathway connected between the first volume and the second volume, the fluid pathway comprising a variable restriction so that in the first mode the variable restriction permits fluid to pass between the first volume and the second volume and in the second mode the variable restriction prohibits fluid from passing between the first volume and the second volume.

In the second mode, common motion of the first and second suspension linkages may cause the first and second springs to constrain the motion of their associated wheel assembly. In the first mode, the cross-vehicle linkage may prohibit the first and second springs from constraining the motion of their associated wheel assembly during common motion of the first and second suspension linkages. The common motion may be a vehicle heave motion. In the second mode, opposite motion of the first and second suspension linkages may cause the cross-vehicle linkage to move laterally across the vehicle. The opposite motion may be a vehicle roll motion.

The vehicle may comprise a first primary rocker pivotally coupled to the vehicle body to rotate about a first axis, the first primary rocker may be coupled to the first suspension linkage so that motion of the first suspension linkage causes rotation of the first primary rocker about the first axis, and the first primary rocker may be pivotally coupled to the first damper so that the damper force is applied to the first suspension linkage via the first primary rocker. The first damper may be attached between the vehicle body and the first primary rocker. The vehicle may comprise a first push rod, wherein the first primary rocker may be coupled to the first suspension linkage by the first push rod. The first spring may be coupled between the first primary rocker and the cross-vehicle linkage so that motion of the first primary rocker transfers force to the cross-vehicle linkage via the first spring. The vehicle may comprise a first secondary rocker pivotally coupled to the cross-vehicle linkage, wherein the first spring may be attached between the first primary rocker and the first secondary rocker so that motion of the first primary rocker transfers force to the cross-vehicle linkage via the first spring and first secondary rocker. The first secondary rocker may be pivotally coupled to the vehicle body to rotate about the first axis. The first spring may be a torsion bar running along the first axis to connect the first primary rocker to the first secondary rocker. The first spring may be a torsion bar running along the first axis to connect the first primary rocker to the cross-vehicle linkage.

The vehicle may comprise a second primary rocker pivotally coupled to the vehicle body to rotate about a second axis, the second primary rocker may be pivotally coupled to the second suspension linkage so that motion of the second suspension linkage cause rotation of the second primary rocker about the second axis, and the second primary rocker may be pivotally coupled to the second damper so that the damper force is applied to the second suspension linkage via the second rocker. The second damper may be attached between the vehicle body and the second primary rocker. The vehicle may comprise a second push rod, wherein the second primary rocker may be coupled to the second suspension linkage by the second push rod. The second spring may be coupled between the second primary rocker and the cross-vehicle linkage so that motion of the second primary rocker transfers force to the cross-vehicle linkage via the second spring. The vehicle may comprise a second secondary rocker pivotally coupled to the cross-vehicle linkage, wherein the second spring may be attached between the second primary rocker and the second secondary rocker so that motion of the second primary rocker transfers force to the cross-vehicle linkage via the second spring and the second secondary rocker. The second secondary rocker may be pivotally coupled to the vehicle body to rotate about the second axis. The second spring may be a torsion bar running along the second axis to connect the second primary rocker to the second secondary rocker. The second spring may be a torsion bar running along the second axis to connect the second primary rocker to the cross-vehicle linkage.

In the second mode, the cross-vehicle linkage may cause the first spring and second spring to react against each other during common motion of the first and second suspension linkages to cause the first and second springs to constrain the motion of their associated wheel assembly.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
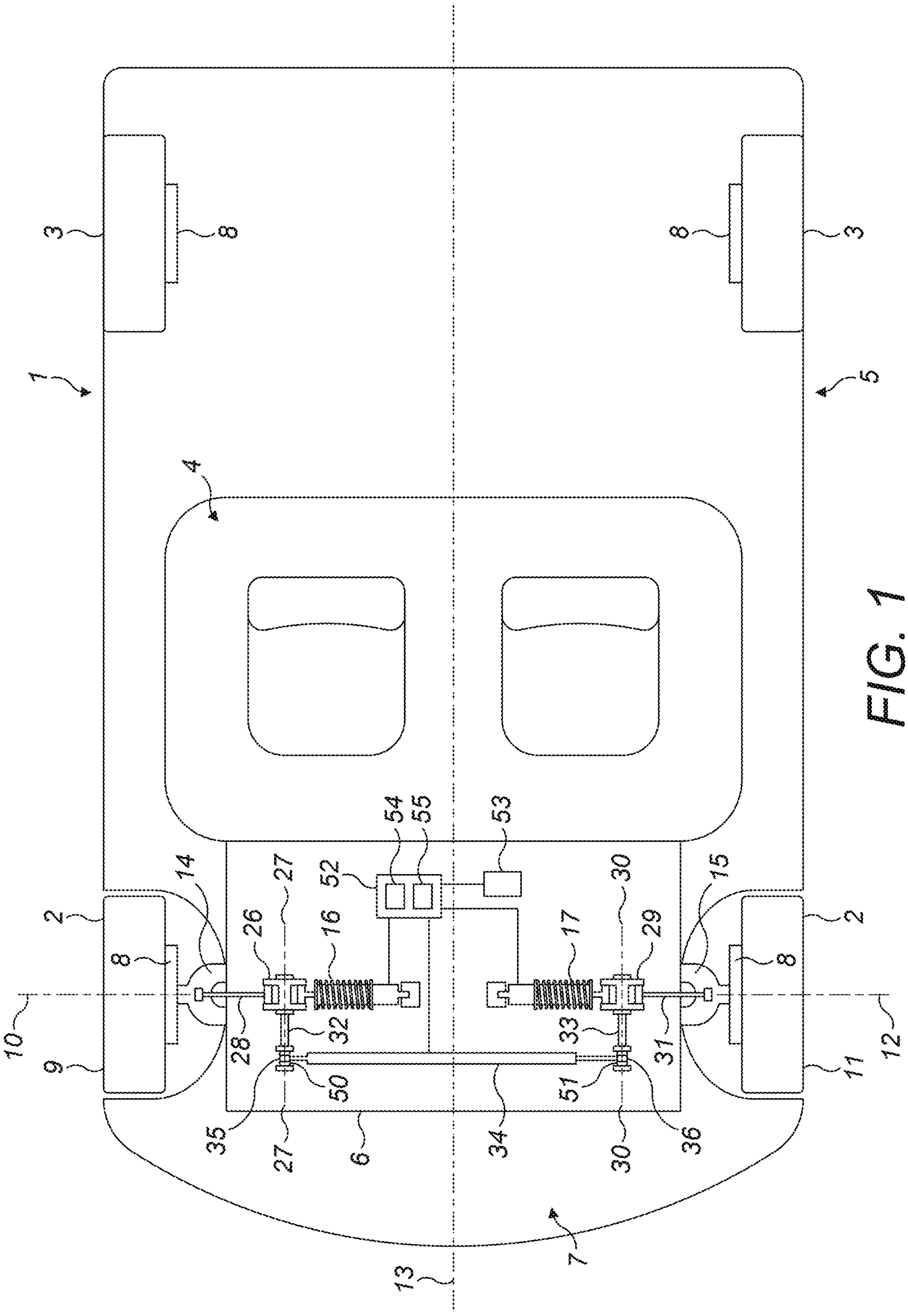
FIG. 1 shows a schematic plan view of a vehicle with a suspension system.

FIG. 1 shows a vehicle 1. The vehicle 1 may be an automobile. The vehicle 1 may be a car. The vehicle 1 comprises front wheels 2 and rear wheels 3. The front of the vehicle is defined with reference to the primary motion direction of the vehicle 1. The front of the vehicle 1 points in the primary motion direction of the vehicle 1. Generally, a vehicle has a primary motion directions that is the forward direction. The vehicle 1 comprises an occupant compartment shown generally at 4. The occupant compartment 4 may comprise one or more seats for occupants of the vehicle to sit in. The occupant compartment 4 may accommodate a driver. The occupant compartment may accommodate one or more passengers. The vehicle 1 may comprise controls located within the occupant compartment to enable an occupant to control the motion of the vehicle. The occupant compartment may also be known as a passenger compartment.

The vehicle comprises a vehicle body 5. The vehicle body 5 comprises a plurality of body panels. For example, the body panels may include bonnet panel(s), side door panel(s), and rear deck panel(s). The vehicle body 5 has an outer surface made up of the outer surface of the body panels. The outer surface of the vehicle body 5 defines the exterior surface of the vehicle 1. The vehicle body 5 also comprises a plurality of structural components which support various vehicle components and the body panels. The vehicle body 5 may form the occupant compartment 4. A schematic example of a structural component 6 is shown as part of the vehicle 1. It will be understood that whilst this is shown as a single block it could be formed of multiple components and potentially take the form of some vehicle components such as an engine or electric motor.

The vehicle comprises a suspension system 7 for supporting the vehicle body 5 on the wheels 2. The suspension system 7 shown in FIG. 1 is located at the front of the vehicle 1. Therefore, the suspension system 7 may be a front suspension system. Whilst it is pictured at the front of the vehicle 1 it will be appreciated that the suspension system could also be positioned at the rear of the vehicle 1. In this case, the suspension system 7 may be a rear suspension system. In this case the suspension system 7 supports the vehicle body on the rear wheels 3.

Figure 2:
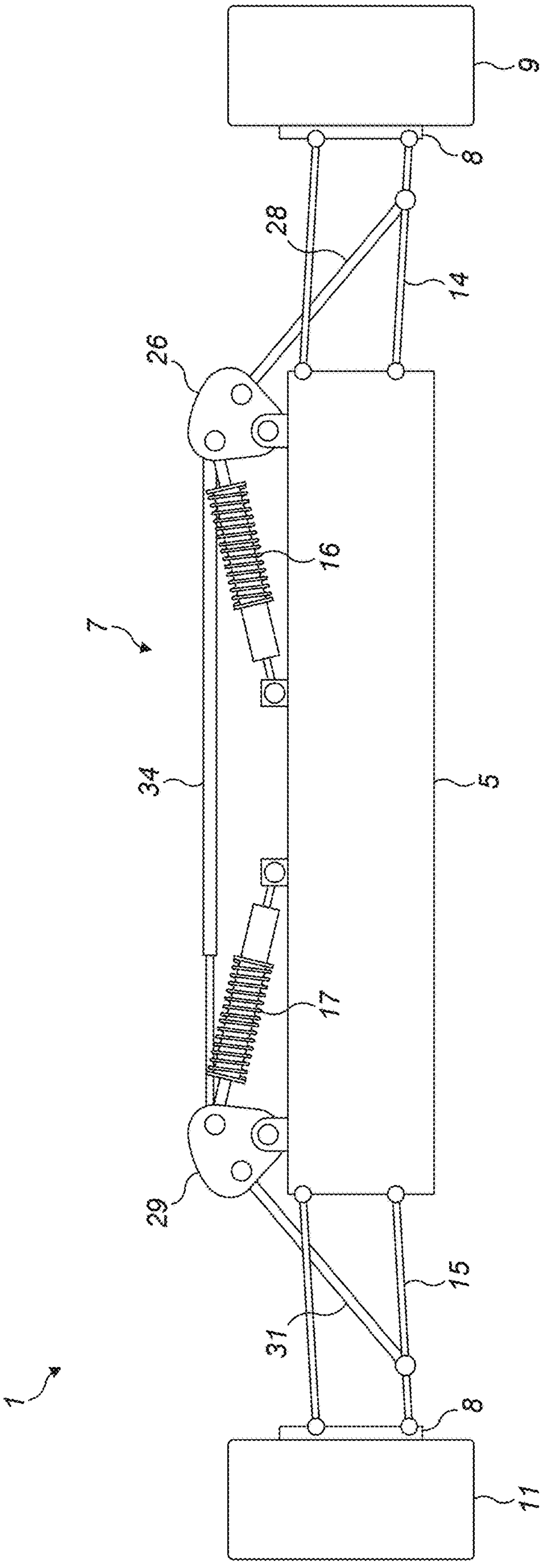
FIG. 2 shows a schematic view of the suspension system of the vehicle from behind the suspension system.
Figure 3:
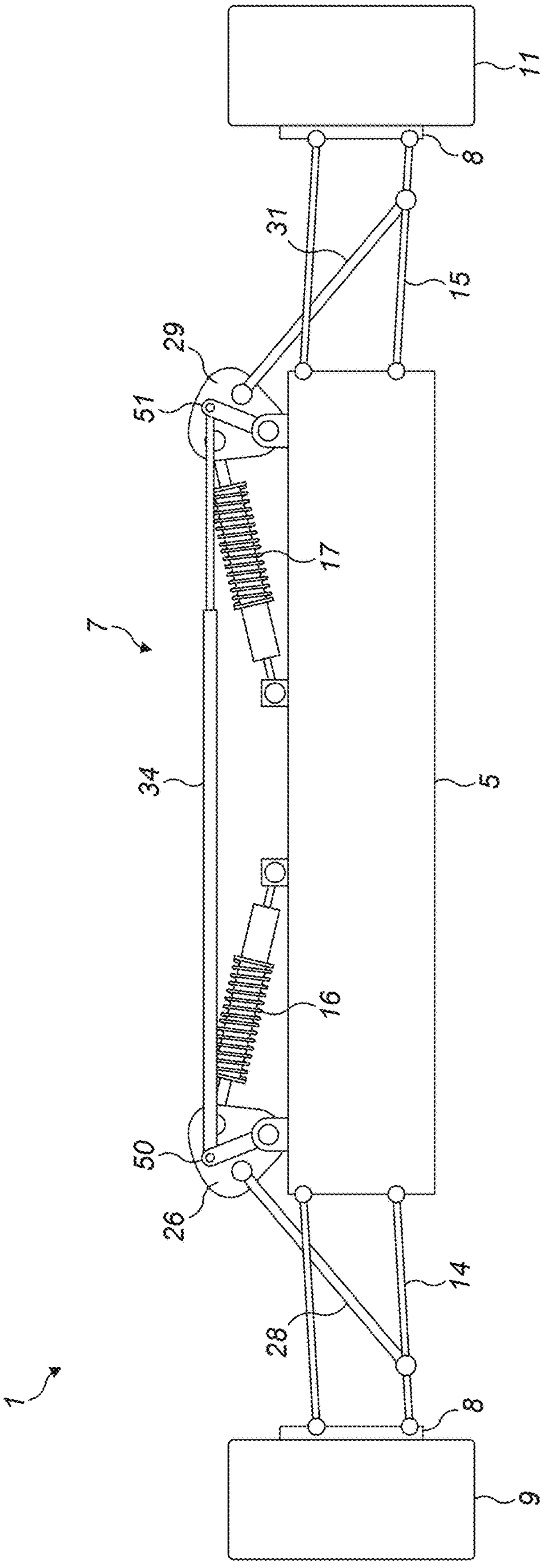
FIG. 3 shows a schematic view of the suspension system of the vehicle from in front of the suspension system.

Various components form part of the suspension system 7 as will be described in relation to the vehicle shown in FIGS. 1 to 3. FIGS. 2 and 3 show schematic drawings of the vehicle 1. FIG. 2 views the suspension system 7 on the vehicle 1 from behind the suspension system 7. I.e. as viewed looking from a position generally located in the occupant compartment 4 of the vehicle 1. FIG. 3 views the suspension system 7 on the vehicle 1 from in front of the suspension system 7. I.e. as viewed looking towards the front nose of the vehicle 1.

Each wheel 2, 3 is typically mounted on bearings 8. Each wheel 2, 3 can rotate about a rotation axis to permit movement on a motion surface such as a road. This rotation axis may be defined by wheel bearing 8. The wheel 2, 3 together with ancillary items such as bearings 8 and, for example, a wheel brake together forms a wheel assembly. Thus, each wheel assembly may have a rotation axis associated with it about which the wheel assembly turns to permit movement on the motion surface.

The vehicle 1 comprises a first wheel assembly 9 having a rotation axis 10. The vehicle 1 comprises a second wheel assembly 11 having a rotation axis 12. As shown in FIG. 1, the first and second wheel assemblies 9, 11 may be front wheel assemblies. The first and second wheel assemblies 9, 11 may be rear wheel assemblies. The first and second wheel assemblies 9, 11 are located on opposite sides of a longitudinal centreline 13 of the vehicle 1.

The vehicle 1 comprises a first suspension linkage 14. The vehicle comprises a second suspension linkage 15. Each suspension linkage 14, 15 couples a respective wheel assembly 9, 11 to the vehicle body 5 to permit motion of the rotation axis of that wheel assembly 9, 11 relative to the vehicle body 5. There is therefore one suspension linkage 14, 15 per wheel.

The suspension linkage 14, 15 may be constituted by a single link. It will be appreciated that the suspension linkage 14, 15 may be constituted by a more complicated arrangement of linkages to couple each wheel 2 to the vehicle body 5 as required by the particular motion requirements of the wheels. For instance, suspension linkage 14, 15 may be a wishbone linkage as illustrated in FIG. 1. The suspension linkage 14, 15 may be a multi-link suspension linkage as shown in FIGS. 2 and 3. The suspension linkage 14, 15 may be a double wishbone linkage.

Each suspension linkage 14, 15 permits motion of the suspension linkage's 14, 15 respective wheel 2 relative to vehicle body 5. Each suspension linkage 14, 15 has a movement range which is the total motion range of the wheel 2 relative to the vehicle body 5. Generally, suspension linkage 14, 15 permits the wheel 2 to move with a generally vertical movement. Other motions of the wheel 2 may also be permitted by suspension linkage 14, 15, for instance the camber of wheel 2 may be permitted to alter and/or the position of the hub/bearing 8 of the wheel may be permitted to move in a lateral direction over the movement range of the suspension linkage 14, 15. The suspension linkages 14, 15 are pivotally coupled to their respective wheel assembly. The suspension linkages 14, 15 are pivotally coupled to the vehicle body 5.

To control the motion of the wheel 2, relative to the vehicle body 5, over the suspension linkage's 14, 15 motion range, the vehicle comprises at least one damper. The vehicle 1 comprises a first damper 16. The vehicle comprises a second damper 17. Each damper 16, 17 is coupled to a respective suspension linkage to constrain the motion of the associated wheel assembly by applying a damper force to the suspension linkage. The dampers 16, 17 each constrain the motion of the suspension linkage 14, 15 over the motion range. Alternatively, or as well as, the damper 16, 17 may be coupled between elements of the suspension linkage to constrain the motion of the suspension linkage 14, 15.

Figure 4:
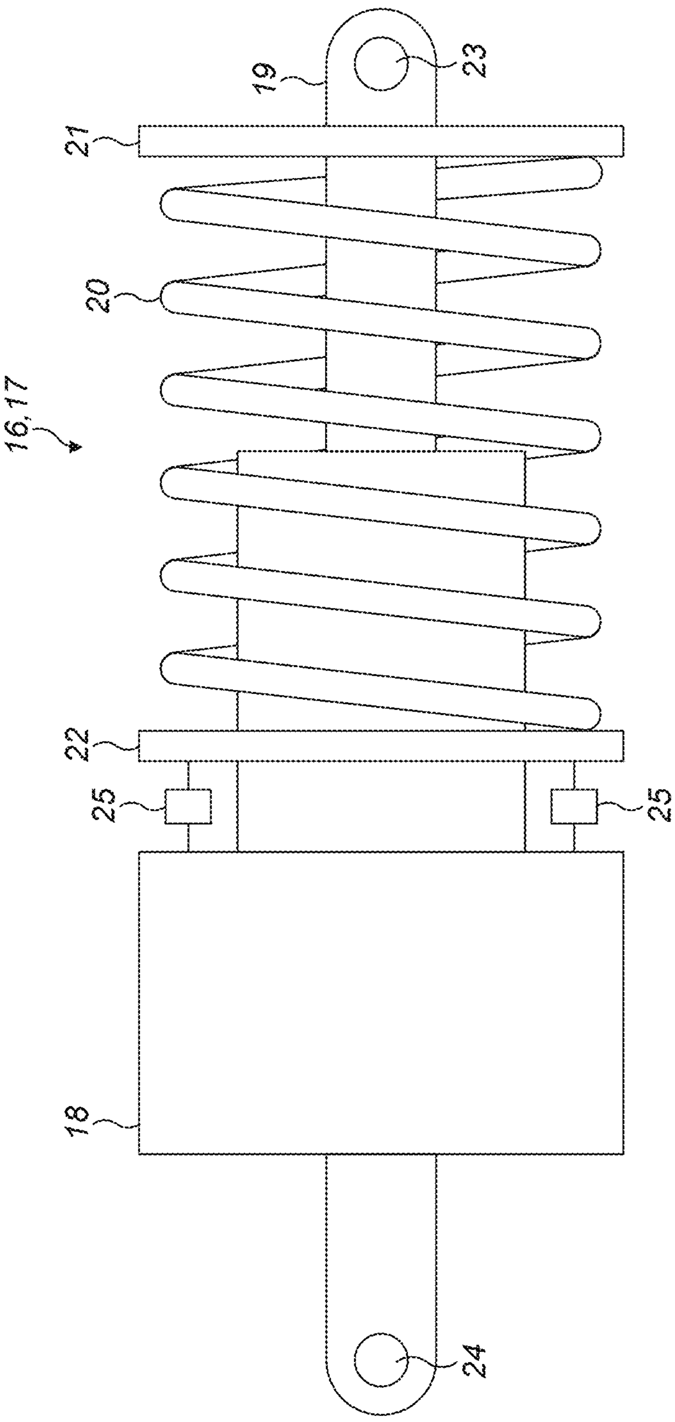
FIG. 4 shows a close-up view of a damper.

FIG. 4 shows a close-up view of a damper 16, 17 and thus shows it in more detail. The damper 16, 17 comprises a damper body 18. The damper 16, 17 comprises a damper rod 19. The damper rod 19 projects from the damper body 18. The damper rod 19 passes inside the damper body 18. The damper body 18 defines a cylinder inside the damper 16, 17. At least one piston is present inside the cylinder. The damper rod 19 is attached to the piston inside the damper body 18. The damper 16, 17 may be a two-chamber damper. In this case, two pistons are present inside the cylinder and the cylinder is divided into two fluidly independent chambers with a piston in each chamber. Such a two-chamber damper may permit heave response to be controlled separately to roll response. The damper 16, 17 may be a hydraulic damper and the damper force may be controlled by controlling the inflow and outflow of hydraulic fluid from the damper unit.

Each damper 16, 17 comprises a damper spring 20. The damper spring 20 contributes to the damper force that is applied by damper 16, 17. The damper spring 20 runs between a first spring seat 21 attached to the damper rod 19 and a second spring seat 22 attached to the damper body 19. The damper spring 20 can thus apply force to the two spring seats which in turn contributes to the damper force.

The damper 16, 17 may have an adjustable length. This means that the at rest extension of the damper rod 19 relative to the damper body 18 is adjustable. The adjustment may be implemented by changing the amount of fluid present to each side of the one or more pistons present inside the damper. To ensure that the preload on the damper spring 20 remains constant the second spring seat 22 may be adjustable. This permits the length of the damper spring 20 at rest to remain constant. The position of the second spring seat 21 relative to the damper body 18 may be adjustable. The second spring seat 22 may be moveable relative to the damper body 18. Thus, when the length of the damper 16, 17 is reduced the second spring seat 22 may be moved away from the end of the damper rod 19 which extends from the damper body 18 and when the length of the damper 16, 17 is increased the second spring seat may be moved towards the end of the damper rod 19 which extends from the damper body 18. The damper 16, 17 comprises a first attachment point 23 located on the damper rod 19 and a second attachment point 24 located on the damper body 18. The length of the damper may be defined as the distance between the first and second attachment points.

The second spring seat 22 may be moved by an actuator 25. The actuator 25 may take any suitable form such as a linear actuator. The actuator may be powered by any suitable means such as electrically or hydraulically.

The vehicle 1 comprises a first primary rocker 26. The first primary rocker 26 is pivotally connected to the vehicle body 5 to rotate about a first axis 27. The first primary rocker 26 is coupled to the first suspension linkage 14. The first primary rocker 26 is coupled to the first suspension linkage 14 so that motion of the first suspension linkage 14 causes rotation of the first primary rocker 26 about the first axis 27. The first primary rocker 26 is pivotally coupled to the first damper 16. The first primary rocker 26 is pivotally coupled to the first damper 16 so that the damper force, of the first damper 16, is applied to the first suspension linkage 14 via the first primary rocker 26. The rotation of the first primary rocker 26 about the first axis 27 transfers force between the first suspension linkage 14 and the first damper 16. The first primary rocker 26 permits the first damper 16 to be oriented in a different direction to the motion of the first suspension linkage 14. The first axis 27 may be perpendicular to the direction in which the damper rod 19 of the first damper 16 moves relative to the damper body 18. In other examples, there may be an angular offset from being perpendicular between the first axis 27 and the direction in which the damper rod 19 of the first damper 16 moves relative to the damper body 18. This may be used to work around packaging difficulties within the vehicle 1.

The first damper 16 is attached between the vehicle body 5 and the first primary rocker 26. One of the first and second attachment points 23, 24 are used to attach the first damper 16 to the vehicle body 5 and the other of the first and second attachment points 23, 24 are used to attach the first damper 16 to the first primary rocker 26. In FIGS. 1 to 3, the first attachment point 23 is attached to the first primary rocker 26 and the second attachment point 24 is attached to the vehicle body 5. The attachment between the first damper 16 and the vehicle body 5 is a pivotal connection. The attachment between the first damper 16 and the first primary rocker 26 is a pivotal connection.

The vehicle 1 comprises a first push rod 28. The first primary rocker 26 is coupled to the first suspension linkage 14 by the first push rod 28. The first push rod 28 transfers force between the first suspension linkage 14 and the first primary rocker 26. Thus, when the first suspension linkage 14 moves this motion causes a motion of the first primary rocker 26 about the first axis 27. The first push rod 28 runs between the first suspension linkage 14 and the first primary rocker 26. The first push rod 28 is pivotally coupled to the first suspension linkage 14. The first push rod 28 is pivotally coupled to the first primary rocker 26.

The vehicle 1 comprises a second primary rocker 29. The second primary rocker 29 is pivotally coupled to the vehicle body 5 to rotate about a second axis 30. The second primary rocker 29 is coupled to the second suspension linkage 15. The second primary rocker 29 is coupled to the second suspension linkage 15 so that motion of the second suspension linkage 15 causes rotation of the second primary rocker 29 about the second axis 30. The second primary rocker 29 is pivotally coupled to the second damper 17. The second primary rocker 29 is pivotally coupled to the second damper 17 so that the damper force, of the second damper 17, is applied to the second suspension linkage 15 via the second primary rocker 29. The rotation of the second primary rocker 29 about the second axis 30 transfers force between the second suspension linkage 15 and the second damper 17. The second primary rocker 29 permits the second damper 17 to be oriented in a different direction to the motion of the second suspension linkage 15. The second axis 30 may be perpendicular to the direction in which the damper rod 19 of the second damper 17 moves relative to the damper body 18. In other examples, there may be an angular offset from being perpendicular between the second axis 30 and the direction in which the damper rod 19 of the first damper 17 moves relative to the damper body 18. This may be used to work around packaging difficulties within the vehicle 1.

The second damper 17 is attached between the vehicle body 5 and the second primary rocker 29. One of the first and second attachment points 23, 24 are used to attach the second damper 17 to the vehicle body 5 and the other of the first and second attachment points 23, 24 are used to attach the second damper 17 to the second primary rocker 29. In FIGS. 1 to 3, the first attachment point 23 is attached to the second primary rocker 29 and the second attachment point 24 is attached to the vehicle body 5. The attachment between the second damper 17 and the vehicle body 5 is a pivotal connection. The attachment between the second damper 17 and the second primary rocker 29 is a pivotal connection.

The vehicle 1 comprises a second push rod 31. The second primary rocker 29 is coupled to the second suspension linkage 15 by the second push rod 31. The second push rod 31 transfers force between the second suspension linkage 15 and the second primary rocker 29. Thus, when the second suspension linkage 15 moves this motion causes a motion of the second primary rocker 29 about the second axis 30. The second push rod 31 runs between the second suspension linkage 15 and the second primary rocker 29. The second push rod 31 is pivotally coupled to the second suspension linkage 15. The second push rod 31 is pivotally coupled to the second primary rocker 29.

The vehicle 1 comprises a first spring 32. The vehicle 1 comprises a second spring 33. Each spring 32, 33 is coupled to a respective suspension linkage 14, 15. The first spring 32 is coupled to the first suspension linkage 14. The second spring 33 is coupled to the second suspension linkage 15.

Figure 5:
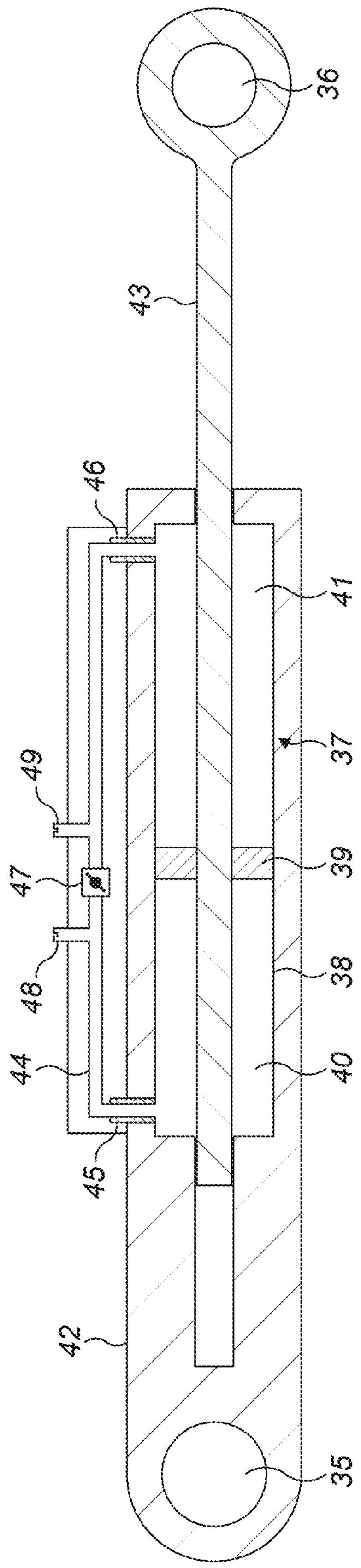
FIG. 5 shows a cross-vehicle linkage.

The vehicle 1 comprises a cross-vehicle linkage 34. The cross-vehicle linkage 34 is coupled between the first spring 32 and the second spring 33. FIG. 5 shows the cross-vehicle linkage 34 in more detail and includes a schematic representation of certain internal components of the cross-vehicle linkage 34.

The cross-vehicle linkage 34 comprises a first attachment point 35. The first attachment point 35 permits connection to other elements of the suspension system. The cross-vehicle linkage comprises a second attachment point 36. The cross-vehicle linkage 34 comprises a cylinder 37. The cylinder 37 comprises a chamber 38. The cross-vehicle linkage 34 comprises a piston 39 moveable along the chamber 38. The piston 39 divides the chamber 38 into a first volume 40 and a second volume 41.

The cross-vehicle linkage 34 comprises a linkage body 42. The cylinder 37 is disposed within linkage body 42. The first attachment point 35 is connected to the linkage body 42. The first attachment point 35 is formed as part of the linkage body 42. The first attachment point 35 is a through hole in linkage body 42. The cross-vehicle linkage 34 comprises a linkage rod 43. The linkage rod 43 is attached to the piston 39 so that movement of the linkage rod 43 causes a corresponding movement of the piston 39. The second attachment point 36 is connected to linkage rod 43. The second attachment point is formed as part of the linkage rod 43. The second attachment point is a through hole in linkage rod 43.

The cross-vehicle linkage 34 comprises a fluid pathway 44. The fluid pathway 44 is connected between the first volume 40 and the second volume 41. The fluid pathway 44 directly connects the first volume 40 to the second volume 41. The cross-vehicle linkage 34 comprises a first outlet 45 connected to the first volume 40 to permit fluid to flow between the first volume 40 and the exterior of the chamber 38. The cross-vehicle linkage 34 comprises a second outlet 46 connected to the second volume 41 to permit fluid to flow between the second volume 41 and the exterior of the chamber 38. The fluid pathway is connected to the first outlet 45 and the second outlet 46. The first outlet 45 is positioned so that it is connected to the first volume irrespective of the position of the piston 39 within the chamber 38. The second outlet 46 is positioned so that it is connected to the second volume 41 irrespective of the position of the piston 39 within the chamber 38. The extent to which the piston 39 is capable of moving along the chamber 38 may be limited so that there is always a first and second volume present within the chamber 38.

The fluid pathway 44 comprises a variable restriction 47. The variable restriction 47 has a first mode in which the variable restriction 47 permits fluid to pass between the first volume 40 and the second volume 41. The variable restriction 47 has a first mode in which the variable restriction 47 permits fluid to pass between the first volume 40 and the second volume 41 via the fluid pathway 44. The variable restriction 47 has a second mode in which the variable restriction 47 prohibits fluid from passing between the first volume and the second volume. The variable restriction 47 has a second mode in which the variable restriction 47 prohibits fluid from passing between the first volume and the second volume via the fluid pathway 44.

The fluid pathway 44 comprises a first pathway outlet 48. The first pathway outlet 48 is positioned along the fluid pathway 44 to the first outlet 45 side of the variable restriction 47 along the fluid pathway 44. This means that fluid can flow between the first volume 40 and the first pathway outlet 48 irrespective of the mode of the variable restriction 47. The first pathway outlet 48 may be a controllable valve that can permit or prohibit fluid flow through the first pathway outlet 48. The fluid pathway 44 comprises a second pathway outlet 49. The second pathway outlet 49 is positioned along the fluid pathway 44 to the second outlet 46 side of the variable restriction 47 along the fluid pathway 44. This means that fluid can flow between the second volume 41 and the second pathway outlet 49 irrespective of the mode of the variable restriction 47. The second pathway outlet 49 may be a controllable valve that can permit or prohibit fluid flow through the second pathway outlet 49. As is described in more detail herein, fluid may be stopped from flowing in or out of the first pathway outlet 48 and fluid may be stopped from flowing in or out of the second pathway outlet 49. Therefore, the variable restriction 47 can stop the piston 39 from moving along the chamber 38 when in the first mode. The variable restriction 47 can permit the piston 39 from moving along the chamber 38 when in the second mode. The first and second pathway outlets 49 permit external fluid flow to cause the piston 39 to move along the chamber 38. This causes a change in length of the cross-vehicle linkage 34.

The cross-vehicle linkage 34 is configured to have a first mode in which the cross-vehicle linkage 34 prohibits the first and second springs 32, 33 from constraining the motion of the associated wheel assembly. In the case of the first spring 32, the cross-vehicle linkage 34 prohibits the first spring 32 from constraining the motion of the first wheel assembly 9. In the case of the second spring 33, the cross-vehicle linkage 34 prohibits the second spring 33 from constraining the motion of the second wheel assembly 11. In the first mode, the variable restriction 47 permits fluid to pass between the first volume 40 and the second volume 41. Thus, when the cross-vehicle linkage 34 is operating in the first mode the variable restriction 47 is operating in the first mode of the variable restriction 47.

The cross-vehicle linkage 34 is configured to have a second mode in which the cross-vehicle linkage 47 permits the first and second springs 32, 33 to constrain the motion of the associated wheel assembly. In the case of the first spring 32, the cross-vehicle linkage 34 permits the first spring 32 to constrain the motion of the first wheel assembly 9. In the case of the second spring 33, the cross-vehicle linkage 34 permits the second spring 33 to constrain the motion of the second wheel assembly 11. In the second mode, the variable restriction 47 prohibits fluid from passing between the first volume 40 and the second volume 41. Thus, when the cross-vehicle linkage 34 is operating in the second mode the variable restriction 47 is operating in the second mode of the variable restriction 47.

The first spring 32 is coupled to the first attachment point 35 of the cross-vehicle linkage 34. The second spring 33 is coupled to the second attachment point 36 of the cross-vehicle linkage 34. In the first mode of the cross-vehicle linkage 37, the cross-vehicle linkage 34 has a variable length between the first and second attachment points 35, 36. In the second mode of the cross-vehicle linkage 37, the cross-vehicle linkage 34 has a fixed length between the first and second attachment points 35, 36.

The first spring 32 is coupled between the first primary rocker 26 and the cross-vehicle linkage 37 so that motion of the first primary rocker 26 transfers force to the cross-vehicle linkage 37 via the first spring 32. The first spring 32 is coupled between the first primary rocker 26 and the cross-vehicle linkage 37 so that rotation of the first primary rocker 26 about the first axis 27 transfers force to the cross-vehicle linkage 37 via the first spring 32.

The vehicle comprises a first secondary rocker 50. The first secondary rocker 50 is pivotally coupled to the vehicle body 5 to rotate about the first axis 27. The first secondary rocker 50 is pivotally coupled to the cross-vehicle linkage 34. The first spring 32 is attached between the first primary rocker 26 and the first secondary rocker 50. The first spring 32 is attached between the first primary rocker 26 and the first secondary rocker 50 so that motion of the first primary rocker 26 transfers force to the cross-vehicle linkage 34 via the first spring 32 and first secondary rocker 50. The first spring 32 is attached between the first primary rocker 26 and the first secondary rocker 50 so that rotation of the first primary rocker 26 about the first axis 27 transfers force to the cross-vehicle linkage 34 via the first spring 32 and first secondary rocker 50. In this way, motion of the first suspension linkage 14 can transfer force to the cross-vehicle linkage 34 via the first primary rocker 26, first spring 32 and first secondary rocker 50.

The first spring 32 is a torsion bar. The first spring 32 runs along the first axis 27 to connect the first primary rocker 26 to the first secondary rocker 50. The first spring 32 runs along the first axis 27 to connect the first primary rocker 26 to the cross-vehicle linkage 37. The first spring 32 is a torsion bar running along the first axis 27 to connect the first primary rocker 26 to the first secondary rocker 50. The first spring 32 is a torsion bar running along the first axis 27 to connect the first primary rocker 26 to the cross-vehicle linkage 37. The first spring 32 imparts force on elements connected to its two ends when the two ends are twisted relative to each other.

The second spring 33 is coupled between the second primary rocker 29 and the cross-vehicle linkage 37 so that motion of the second primary rocker 29 transfers force to the cross-vehicle linkage 37 via the second spring 33. The second spring 33 is coupled between the second primary rocker 29 and the cross-vehicle linkage 37 so that rotation of the second primary rocker 29 about the second axis 30 transfers force to the cross-vehicle linkage 37 via the second spring 33.

The vehicle comprises a second secondary rocker 51. The second secondary rocker 51 is pivotally coupled to the vehicle body 5 to rotate about the second axis 30. The second secondary rocker 51 is pivotally coupled to the cross-vehicle linkage 34. The second spring 33 is attached between the second primary rocker 29 and the second secondary rocker 51. The second spring 33 is attached between the second primary rocker 29 and the second secondary rocker 51 so that motion of the second primary rocker 29 transfers force to the cross-vehicle linkage 34 via the second spring 33 and second secondary rocker 51. The second spring 33 is attached between the second primary rocker 29 and the second secondary rocker 51 so that rotation of the second primary rocker 29 about the second axis 30 transfers force to the cross-vehicle linkage 34 via the second spring 33 and second secondary rocker 51. In this way, motion of the second suspension linkage 15 can transfer force to the cross-vehicle linkage 34 via the second primary rocker 29, second spring 33 and second secondary rocker 51.

The second spring 33 is a torsion bar. The second spring 33 runs along the second axis 30 to connect the second primary rocker 29 to the second secondary rocker 51. The second spring 33 runs along the second axis 30 to connect the second primary rocker 29 to the cross-vehicle linkage 37. The second spring 33 is a torsion bar running along the second axis 30 to connect the second primary rocker 29 to the second secondary rocker 51. The second spring 33 is a torsion bar running along the second axis 30 to connect the second primary rocker 29 to the cross-vehicle linkage 37.

The second spring 33 imparts force on elements connected to its two ends when the two ends are twisted relative to each other.

The two modes of the cross-vehicle linkage 34 mean that it can be selected as to whether the second springs 32, 33 provide constraint to the motion of the suspension linkages 14, 15 or not.

When the cross-vehicle linkage 34 is operating in the first mode the secondary rockers 50, 51 are free to move relative to each other and so do not provide resistance to the first and second springs 32, 33 to act against. This means that the first and second springs move with their respective primary rockers and so do not transfer force to their connected primary rocker.

When the cross-vehicle linkage 34 is operating in the second mode the secondary rockers 50, 51 are constrained in dependence on their relative motion. If the secondary rockers 50, 51 move in the same rotational direction then the cross-vehicle linkage 34 moves laterally across the vehicle 1 and so the secondary rockers 50, 51 are not constrained in their motion. This means that the secondary rockers 50, 51 do not provide resistance to the first and second springs 32, 33 to act against. This means that in this motion the first and second springs move with their primary rockers and so do not transfer force to their connected primary rocker. This motion of the secondary rockers 50, 51 is when the vehicle 1 is undergoing a roll motion. If the secondary rockers 50, 51 attempt to move in opposite rotational directions then, as the length of the cross-vehicle linkage 34 is fixed in the second mode, the secondary rockers 50, 51 are constrained in their relative motion. This means that they provide resistance to the first and second springs 32, 33 to act about during this type of motion. This means that in this motion the end of the first and second springs 32, 33 connected to their secondary rocker is fixed and so a rotation of the end of the first and second springs 32, 33 attached to their primary rocker 26, 29 causes a force to be imparted on the respective primary rocker 26, 29. This motion of the secondary rockers 50, 51 is when the vehicle is undergoing a heave motion. Thus, the second mode provides a different level of heave stiffness relative to the first mode. The second mode provides a greater level of heave stiffness relative to the first mode.

In the first mode of the cross-vehicle linkage 34, the cross-vehicle linkage 34 prohibits the first and second springs from constraining the motion of their associated wheel assembly 9, 11 during common motion of the first and second suspension linkages 14, 15. In the first mode of the cross vehicle linkage 34, the cross-vehicle linkage 34 prohibits the first and second springs from constraining the motion of their respective first and second wheel assembly 9, 11 during common motion of the first and second suspension linkages 14, 15. In the second mode of the cross vehicle linkage 34, common motion of the first and second suspension linkages 14, 15 causes the first and second springs 32, 33 to constrain the motion of their associated wheel assembly 9, 11. In the second mode of the cross vehicle linkage 34, common motion of the first and second suspension linkages 14, 15 causes the first and second springs 32, 33 to constrain the motion of their respective first and second wheel assembly 9, 11. In the second mode, the cross-vehicle linkage 34 causes the first spring 32 and second spring 33 to react against each other during common motion of the first and second suspension linkages 14, 15 to cause the first and second springs 32, 33 to constrain the motion of their associated wheel assembly 14, 15. In the second mode, the cross-vehicle linkage 34 causes the first spring 32 and second spring 33 to react against each other during common motion of the first and second suspension linkages 14, 15 to cause the first and second springs 32, 33 to constrain the motion of their respective first and second wheel assembly 14, 15. The common motion of the first and second suspension linkages 14, 15 is a vehicle heave motion.

A vehicle heave motion is where the vehicle motion is in a direction perpendicular to the running surface of the vehicle 1. The heave motion may be a movement of the whole vehicle relative to the running surface of the vehicle 1. The heave motion may be a movement of one end of the vehicle relative to the running surface of the vehicle 1.

In the second mode of the cross-vehicle linkage 34, opposite motion of the first and second suspension linkages causes the cross-vehicle linkage 34 to move laterally across the vehicle. In the second mode of the cross-vehicle linkage 34, the cross-vehicle linkage 34 prohibits the first and second springs from constraining the motion of their associated wheel assembly 9, 11 during opposite motion of the first and second suspension linkages 14, 15. In the first mode of the cross-vehicle linkage 34, the cross-vehicle linkage 34 prohibits the first and second springs from constraining the motion of their associated wheel assembly 9, 11 during opposite motion of the first and second suspension linkages 14, 15. In the first mode of the cross vehicle linkage 34, the cross-vehicle linkage 34 prohibits the first and second springs from constraining the motion of their respective first and second wheel assembly 9, 11 during opposite motion of the first and second suspension linkages 14, 15. The opposite motion is a vehicle roll motion.

A vehicle roll motion is where the vehicle motion is rotating about the longitudinal direction 13 of the vehicle 1.

The vehicle 1 may experience both a heave motion and a roll motion at the same time. In this case, in the second mode, the cross-vehicle linkage 34, permits the first and second springs to provide constraint for the part of the motion that is in heave. In this case, in the second mode, the cross-vehicle linkage 34, does not permit the first and second springs to provide constraint for the part of the motion that is in roll.

The vehicle 1 comprises one or more control units 52 configured to control vehicle functions. The control unit 52 may be a suspension controller 52. The control unit 52 is connected to various suspension components. For instance, the control unit 52 is connected to the first damper 16, the second damper 17 and the cross-vehicle linkage 34. The control unit 52 may be connected to one or more pumps 53. The one or more pumps 53 are configured to pump hydraulic fluid. The one or more pumps 53 may be connected to one or more of the first damper 16, the second damper 17 and the cross-vehicle linkage 34. The vehicle 1 may comprise one or more hydraulic circuits connected between one or more of the first damper 16, the second damper 17, the cross-vehicle linkage 34 and the one or more pumps 53. The control unit 52 may be configured to control one or more of the variable restriction 47, the first pathway outlet 48, the second pathway outlet 49, the one or more pumps 53, and the actuator 25.

The control unit 52 may comprise a processor 54 and memory 55. The memory 55 may be non-volatile memory. The control unit 52 may be formed as a more general vehicle control unit. This vehicle control unit may control various vehicle functions. Those vehicle functions may be the ones in the vicinity of the control unit. The control unit 52 may comprise more than one processor and more than one memory. The memory stores a set of program instructions that are executable by the processor, and reference data such as look-up tables that can be referenced by the processor in response to those instructions. The processor may be configured to operate in accordance with a computer program stored in non-transitory form on a machine-readable storage medium. The computer program may store instructions for causing changes in the operation of the suspension system as described herein.

The vehicle 1 may be configured to operate in a first dynamic mode and a second dynamic mode. The dynamic modes are vehicle operating modes which set various vehicle components to particular operating parameters. The control unit 52 may be configured to set the suspension system into the first dynamic mode and the second dynamic mode. The control unit 52 may be responsive to a user input to select whether the vehicle 1 is in the first dynamic mode or second dynamic mode. The first dynamic mode may be a normal dynamic mode. The first dynamic mode may be a comfort dynamic mode. The first dynamic mode may prioritise passenger comfort over vehicle performance. The second dynamic mode may be a race mode. The second dynamic mode may be a track mode. The second dynamic mode may prioritise vehicle performance over passenger comfort.

The control unit 52 may be configured to set the cross-vehicle linkage 34 to operate in the first mode. The control unit 52 may be configured to set the cross-vehicle linkage 34 to operate in the first mode when the vehicle 1 is set to the first dynamic mode. The control unit 52 may be configured to set the cross-vehicle linkage 34 to operate in the second mode. The control unit 52 may be configured to set the cross-vehicle linkage 34 to operate in the second mode when the vehicle 1 is set to the second dynamic mode. The control unit 52 may be configured to set the variable restriction 47 to the first mode when the vehicle 1 is set to the first dynamic mode. The control unit 52 may be configured to set the variable restriction 47 to the second mode when the vehicle 1 is set to the second dynamic mode.

The first and second dampers may have a first length in the first dynamic mode and a second length in the second dynamic mode. The first length may be longer than the second length. The control unit 52 may be configured to cause the first and second dampers 16, 17 to change length between the first length and the second length in dependence on the dynamic mode. The control unit 52 may be configured to set the first and second dampers 16, 17 to the first length in the first dynamic mode. The control unit 52 may be configured to set the first and second dampers 16, 17 to the second length in the second dynamic mode. The control unit 52 may be configured to cause the actuator 25 to change the position of the second spring seat 22 of each damper 16, 17. The control unit 52 may be configured to cause the first and second dampers 16, 17 to change the amount of fluid present to each side of the one or more pistons present inside the damper. The control unit 52 may be configured to control one or more valve present on the damper and the one or more pumps connected to the damper 16, 17 to adjust the position of the pistons.

The change in damper length causes a change in ride height of the vehicle 1. The vehicle 1 may have a first ride height in the first dynamic mode. The vehicle 1 may have a second ride height in the second dynamic mode. The second ride height may be less than the first ride height.

To permit the first and second dampers to move from the second length to the first length the control unit 52 may be configured to cause the variable restriction 47 to open (if presently shut) to permit fluid to flow from the second volume to the first volume. To permit the first and second dampers to move from the first length to the second length the control unit 52 may be configured to cause the variable restriction 47 to open (if presently shut) to permit fluid to flow from the first volume to the second volume. This permits the piston 39 to move along the chamber 38 in response to the change in length of the dampers. If moving to the second dynamic mode then after the first and second dampers reach the second length then the control unit 52 may be configured to cause the variable restriction 47 to shut.

The control unit 52 is configured to control whether the first pathway outlet 48 is open or closed. The control unit 52 is configured to control whether the second pathway outlet 49 is open or closed. In normal operation the first and second pathway outlets 48, 49 are closed. The control unit 52 is configured to close the first and second pathway outlets 48, 49. The control unit 52 is configured to close the first and second pathway outlets 48, 49 during normal operation of the vehicle 1.

The vehicle 1 may be configured to undertake a nose lift operation. The vehicle 1 may undertake a nose lift operation in response to a user command. In a nose lift operation, the nose of the vehicle 1 is raised relative to normal operating positions of the nose when the vehicle 1 is at rest. During a nose lift operation, the control unit 52 is configured to:

Cause the variable restriction 47 to shut.

Open the first and second pathway outlets 48, 49.

Cause the pump 53 to pump fluid into the first volume 40. The pumping causes fluid to be expelled from second volume 41. The pumping causes the length of the cross-vehicle linkage to increase. The length increase causes force to be exerted on the first and second suspension linkage which causes the front of the vehicle to rise up. The force is exerted via the second springs, secondary rockers, primary rockers and push rods.

Once the cross-vehicle linkage has reached maximum extension, then the first and second pathway outlets 48, 49 may be shut.

The control unit 52 may be configured to exit a nose lift operation by opening the variable restriction 47 which causes fluid to flow between the first and second volumes to permit the vehicle 1 to return to a normal ride height.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:

a vehicle body;

first and second wheel assemblies each having a rotation axis;

first and second suspension linkages, each suspension linkage coupling a respective wheel assembly to the vehicle body to permit motion of the rotation axis of that wheel assembly relative to the vehicle body;

first and second dampers, each damper coupled to a respective suspension linkage to constrain the motion of the associated wheel assembly by applying a damper force to the suspension linkage;

first and second springs, each spring coupled to a respective suspension linkage; and a cross-vehicle linkage coupled between the first and second springs, the cross-vehicle linkage being configured to have: (i) a first mode in which the cross-vehicle linkage prohibits the first and second springs from constraining the motion of the associated wheel assembly, and (ii) a second mode in which the cross-vehicle linkage permits the first and second springs to constrain the motion of the associated wheel assembly.

2. The vehicle according to claim 1, wherein the first and second wheel assemblies are front wheel assemblies and are located on opposite sides of a longitudinal centreline of the vehicle.

3. The vehicle according to claim 1, wherein the first spring is coupled to a first attachment point of the cross-vehicle linkage and the second spring is coupled to a second attachment point of the vehicle linkage, in the first mode the cross-vehicle linkage has a variable length between the first and second attachment points and in the second mode the cross-vehicle linkage has a fixed length between the first and second attachment points.

4. The vehicle according to claim 1, wherein the cross-vehicle linkage comprises: a cylinder comprising a chamber; a piston moveable along the chamber, the piston dividing the chamber into a first volume and a second volume; and a fluid pathway connected between the first volume and the second volume, the fluid pathway comprising a variable restriction so that in the first mode the variable restriction permits fluid to pass between the first volume and the second volume and in the second mode the variable restriction prohibits fluid from passing between the first volume and the second volume.

5. The vehicle according to claim 1, wherein, in the second mode, common motion of the first and second suspension linkages causes the first and second springs to constrain the motion of their associated wheel assembly; wherein, in the first mode, the cross-vehicle linkage prohibits the first and second springs from constraining the motion of their associated wheel assembly during common motion of the first and second suspension linkages; and wherein the common motion is a vehicle heave motion.

6. The vehicle according to claim 1, wherein, in the second mode, opposite motion of the first and second suspension linkages causes the cross-vehicle linkage to move laterally across the vehicle; and wherein the opposite motion is a vehicle roll motion.

7. The vehicle according to claim 1, the vehicle comprising a first primary rocker pivotally coupled to the vehicle body to rotate about a first axis, the first primary rocker is coupled to the first suspension linkage so that motion of the first suspension linkage causes rotation of the first primary rocker about the first axis, and the first primary rocker is pivotally coupled to the first damper so that the damper force is applied to the first suspension linkage via the first primary rocker.

8. The vehicle according to claim 7, wherein the first damper is attached between the vehicle body and the first primary rocker.

9. The vehicle according to claim 7, the vehicle comprising a first push rod, wherein the first primary rocker is coupled to the first suspension linkage by the first push rod.

10. The vehicle according to claim 7, wherein the first spring is coupled between the first primary rocker and the cross-vehicle linkage so that motion of the first primary rocker transfers force to the cross-vehicle linkage via the first spring.

11. The vehicle according to claim 7, the vehicle comprising a first secondary rocker pivotally coupled to the cross-vehicle linkage, wherein the first spring is attached between the first primary rocker and the first secondary rocker so that motion of the first primary rocker transfers force to the cross-vehicle linkage via the first spring and first secondary rocker.

12. The vehicle according to claim 11, wherein the first spring is a torsion bar running along the first axis to connect the first primary rocker to the first secondary rocker.

13. The vehicle according to claim 7, wherein the first spring is a torsion bar running along the first axis to connect the first primary rocker to the cross-vehicle linkage.

14. The vehicle according to claim 1, the vehicle comprising a second primary rocker pivotally coupled to the vehicle body to rotate about a second axis, the second primary rocker is pivotally coupled to the second suspension linkage so that motion of the second suspension linkage cause rotation of the second primary rocker about the second axis, and the second primary rocker is pivotally coupled to the second damper so that the damper force is applied to the second suspension linkage via the second rocker.

15. The vehicle according to claim 14, wherein the second damper is attached between the vehicle body and the second primary rocker.

16. The vehicle according to claim 14, the vehicle comprising a second push rod, wherein the second primary rocker is coupled to the second suspension linkage by the second push rod.

17. The vehicle according to claim 14, wherein the second spring is coupled between the second primary rocker and the cross-vehicle linkage so that motion of the second primary rocker transfers force to the cross-vehicle linkage via the second spring.

18. The vehicle according to claim 14, the vehicle comprising a second secondary rocker pivotally coupled to the cross-vehicle linkage, wherein the second spring is attached between the second primary rocker and the second secondary rocker so that motion of the second primary rocker transfers force to the cross-vehicle linkage via the second spring and the second secondary rocker.

19. The vehicle according to claim 18, wherein the second spring is a torsion bar running along the second axis to connect the second primary rocker to the second secondary rocker.

20. The vehicle according to claim 14, wherein the second spring is a torsion bar running along the second axis to connect the second primary rocker to the cross-vehicle linkage.

* * * * *